Patented Nov. 7, 1944

2,362,311

UNITED STATES PATENT OFFICE 2,362,311

POLYMERIZATION OF OLEFINS AND CATALYST THEREFOR

Louis C. Rubin, West Caldwell, N. J., assignor to The Polymerization Process Corporation, Jersey City, N. J., a corporation of Delaware No Drawing. Original application February 29, 1940, Serial No. 321,521. Divided and this application December 16, 1942, Serial No. 469,254

12 Claims. (Cl. 260—683.15)

This invention relates to the conversion of olefinic hydrocarbons to hydrocarbons of higher boiling points, by means of catalytic contact material. More particularly, the invention relates to the conversion of olefinic hydrocarbons by means of metal pyrophosphate contact agents of improved characteristics.

Certain metal pyrophosphates, including those of copper, mercury, zinc, magnesium, iron, aluminum and cobalt are capable of promoting the conversion of olefins to higher boiling hydrocarbon products. Such pyrophosphates are advantageously employed in the form of granular masses. The granules may be formed by crushing the filter cake if the pyrophosphate is obtained by precipitation, or by pelleting or extrusion of a more finely divided mixture. Pyrophosphates are employed in the granular form in order that the fluid reactants may be passed through a granular mass of the catalytic material at relatively high velocity and without excessive pressure drop.

Each of the pyrophosphates of the metals mentioned above becomes active in the promotion of the conversion reactions by the formation therein, under the conversion conditions employed, of an active modification which is probably the true catalyst for the reaction. Formation of the active modification probably involves reduction, such as, in the case of copper pyrophosphate, reduction of the copper from the cupric to the cuprous state.

It is found that during the conversion treatment the granules become softened whereby they collapse or disintegrate. This is probably due to the fact that the reactions which result in the formation of the active modification of the pyrophosphate affect the material which forms the structure of the granules. Consequently, during the conversion treatment the body of catalytic material employed tends to consolidate gradually whereby the pressure drop through the conversion chamber is increased. Consolidation of the granular catalytic material through collapse and disintegration of the granules may result in the accumulation, within the body of catalytic material, of relatively high boiling conversion products which are less easily removed by the flow of the fluid reactants due to the decrease in the velocity of the reactants in their passage through the body of catalytic material. Such deposits decrease the number of active centers in the catalytic material with the result that the conversion rate is decreased. As a result of increase in pressure drop and decrease in conversion rate the conversion treatment must be terminated before it would be necessary if the granular mass of catalytic material did not become softened with resulting collapse and disintegration.

It is an object of the present invention to provide a conversion treatment wherein the fluid reactants are passed over catalytic contact material, comprising an active pyrophosphate, in the form of granules which are less susceptible to collapse and disintegration than granules consisting only of the pyrophosphate. It is a further object of the invention to provide a method for the conversion of olefinic hydrocarbons to hydrocarbons of higher boiling points by the passage of said hydrocarbons over granular catalytic material which retains its shape during the conversion operation with the result that operating runs of longer duration are made possible but at the same rates of conversion as would be obtained in the presence of a granular catalytic material consisting of an active metal pyrophosphate.

The granular catalytic material employed in the conversion process comprises a plurality of granules each of which includes a substantial proportion of an active metal pyrophosphate in intimate mixture with a finely divided supporting material which is non-reactive with the metal pyrophosphate, stable under the conversion conditions, and is inert to, or non-reactive with, the modifications, or reduction products, of the pyrophosphate which are formed during the conversion reaction.

The supporting material employed may be any suitable material which is suitably inert under the conditions of the conversion treatment. For example, metal pyrophosphates which are not capable of ready reduction to a polymerization catalyst may be employed as well as metal orthophosphates, such as calcium phosphate in the ortho, pyro, or meta form of the phosphates of tin, nickel, or lead.

Natural materials such as silica, kieselguhr, alumina, clay, etc. are unsuitable for use as supporting material.

The supporting material is employed in a finely divided form and generally should be sufficiently sub-divided to pass a 200 mesh screen. For maximum granular strength it is desirable that the supporting material should be employed in a form wherein the particles do not exceed approximately fifty microns in average diameter.

In accordance with the invention the catalytic contact material is employed in the form of granules which have a volume many times that of the individual particles of supporting material dispersed in each granule. Advantageously, the catalytic contact material is employed in the form of granules having an average diameter of one to ten millimeters although larger or smaller sizes may be employed as warranted by the character of the reactants and variations in the reaction conditions. Each granule will therefore have an average diameter at least ten times the average diameter of the particles of supporting material contained therein. Each granule will contain at least one hundred particles of supporting material and may include thousands of such particles.

Preferably, the desired metal pyrophosphate and the supporting material are intimately mixed and then pressed into granules of the desired size and shape. The granules may be made advantageously by extruding a mixture of the supporting material and metal pyrophosphate in the form of rods of a suitable diameter which are thereafter cut in suitable lengths to form cylindrical granules of the desired size.

The relative proportions of metal pyrophosphate and finely divided supporting material which are employed in the mixture depend upon the density of the supporting material. It is found, however, that for each supporting material employed there is a preferred range of ratios of supporting material to metal pyrophosphate in which are found the combinations which produce granules of maximum strength and resistance to softening and disintegration during the conversion treatment.

The mixture of supporting material and metal pyrophosphate is formed advantageously by maintaining an aqueous suspension of the finely divided supporting material and effecting in said suspension a precipitation of the desred metal pyrophosphate. In this way at least a portion of the metal pyrophosphate is precipitated on and, possibly, in the particles of suspended supporting material. The mixture is filtered to obtain a filter cake comprising an intimate mixture of finely divided supporting material and the desired metal pyrophosphate. The resulting mixture may be broken to form granules of the desired size or may be crushed and pressed or extruded to form pellets of the desired size.

Another method of forming the mixture of pyrophosphate and supporting material involves coprecipitation of the pyrophosphate and the supporting material. For example, a mixture of copper pyrophosphate and calcium pyrophosphate may be coprecipitated, the latter being inactive and serving as the supporting material.

The mixture of active pyrophosphate and supporting material may be formed also by adding the finely divided supporting material to a slurry of precipitated metal pyrophosphate if adequate precautions are taken to effect a thorough mixing of the materials.

In preparing the catalytic contact material by methods which involve the precipitation of the metal pyrophosphate it is desirable in connection with certain of the pyrophosphates, particularly copper pyrophosphate, to employ the reagents, such as a soluble pyrophosphate and a soluble copper salt, in proportions such that there is no excess of the soluble pyrophosphate over the amount necessary to react with all of the metal salt present. Preferably, an excess of the metal salt is employed. This precaution is necessary because certain of the soluble pyrophosphates, such as sodium pyrophosphate, form double salts with copper pyrophosphate and other metal pyrophosphates. The presence of such double salts, during the conversion treatment, appears to retard reduction of the metal pyrophosphates to the active form.

In observing such precautions it is desirable to effect thorough mixing of the soluble pyrophosphate solution and the metal salt solution, and it is advantageous to mix the solutions by pouring the solution of the soluble pyrophosphate, such as sodium pyrophosphate, into the metal salt solution whereby there is maintained during the precipitation reaction an excess of the metal salt in relation to the soluble pyrophosphate. Advantageously, the finely divided supporting material is suspended in a solution of the metal salt, such as copper sulphate, and while the suspension is maintained, for example by stirring, the soluble pyrophosphate solution is admixed therewith. After continued stirring to insure adequate mixing of the ingredients the resulting mixture of precipitated metal pyrophosphate and supporting material is separated from accompanying water and formed into pellets, as has been described.

The granular material thus prepared may be used as such or may have admixed therewith granules of inactive material, such as granular charcoal, the latter acting as a spacer in the contact material.

The invention will be described further by reference to a specific example wherein copper pyrophosphate is employed as the desired metal pyrophosphate. It is to be understood, however, that such example is intended merely to illustrate the application of the invention and is not intended to limit the scope of the invention which includes the use of other active metal pyrophosphates and other supporting materials. The example furthermore relates particularly to the treatment of normally gaseous hydrocarbon mixtures including gaseous olefins. It is to be understood, however, that the invention is not limited to the treatment of normally gaseous olefinic hydrocarbons but is applicable to the treatment of normally liquid olefinic hydrocarbons or mixtures of liquid and gaseous olefinic hydrocarbons.

*Example*

Calcium metaphosphate was prepared by heating calcium phosphate monobasic at 1300° F. for one hour. One part by weight of this material, in finely divided form, was intimately mixed with two parts by weight of finely divided copper pyrophosphate. This mixture was then formed into $\frac{3}{16}$ inch pellets using one per cent graphite. Catalytic material thus prepared was employed in the treatment of a gas consisting, by volume, of 0.3 per cent ethylene, 2.6 per cent ethane, 10.5 per cent propylene, 25.4 per cent propane, 10.0 per cent isobutylene, 15.0 per cent normal butylenes and 36.2 per cent butane. The gas, saturated with water vapor at 85° F. and the operating pressure, was passed through the granular contact mass under a pressure of 1000 pounds per square inch at a rate of approximately 19 cubic feet (measured as gas at standard conditions of temperature and pressure) per pound of contact material per hour (or approximately 1000 volumes of gas per volume of contact material per hour). At a reaction temperature of 425° F. the reaction product had a liquid content of approximately 35 per cent. After about ten gallons of liquid per pound of contact material had been produced the exit gases contained 6.1 per cent unsaturates, representing 88 per cent conversion. After about 30 gallons of liquid per pound of contact material had been produced the exit gases contained 10.0 per cent unsaturates, representing 79 per cent conversion, the gas charge having been changed meanwhile to one consisting of, by volume, 0.5 per cent ethane, 9.0 per cent propylene, 22.4 per cent propane, 10.6 per cent isobutylene, 16.3 per cent normal butylenes, and 41.2 per cent butane. The run was terminated after 296 hours and a liquid production of over 33 gallons per pound of contact material. The greater part of the contact material was recovered in granular form.

It is found that in the preparation of the catalyst, as in the foregoing example, the mixture, prior to extrusion, should be dried to a water content of not more than 60 per cent and not less than 40 per cent in order to produce pellets of sufficient strength. In general it is noted that the apparent density of the dried pellets is a direct function of the water content of the extruded mixture, higher density being associated with lower percentages of water. The mechanical strength of the pellets is improved with increasing apparent density.

In carrying out the process of the invention as illustrated by the foregoing example the gases or other hydrocarbon fluid are passed in contact with the catalytic contact material in a suitable chamber or reactor, the gases being suitably preheated. Any suitable pressure may be used, but it is preferable to employ relatively high pressures, for example in excess of 150 pounds per square inch, although atmospheric pressure or lower pressures may be employed. The rate of polymerization of the olefinic hydrocarbons is a function of the concentration of these materials, and accordingly for maximum conversion such reactions are best run at superatmospheric pressure. The use of relatively high pressures apparently also has a beneficial effect on the granular contact material in assisting to preserve its original form whereby runs of longer duration are possible.

The optimum reaction temperature depends somewhat upon the nature of the material under treatment and the product desired. For example, conversion of gaseous olefins such as butylenes at a temperature of approximately 300° to 400° F. is advantageous for effecting maximum conversion to a product consisting essentially of gasoline constituents. In the treatment of a gaseous mixture containing substantial quantities of propylene, as in the foregoing example, a temperature of 400° F. or higher is desirable for effecting substantial conversion.

The extent of reaction and the character of the liquid product are affected also by the length of reaction time during which the charge remains in contact with the contact material under the operating conditions. In general the hydrocarbons should be passed over the contact material at a rate of 2 to 50 cubic feet (measured as gas at standard conditions of temperature and pressure) per pound of catalyst per hour. Otherwise expressed, the hydrocarbon fluid may be passed through the reactor at a rate of 50 to 6000 volumes per hour per volume of catalytic contact material depending upon the apparent density of the contact material. For material having an apparent density of about 0.5 this range would be 60 to 1500 volumes of contact material per hour.

It is apparent that for any given charge the extent of reaction and the character of the liquid product depend mainly upon the operating pressure, the operating temperature and the space velocity of the charge. Many combinations of these variables will yield the desired amount and quality of product. For example, in the treatment of a gaseous mixture containing substantial quantities of isobutylene it may be desirable to operate at a relatively low temperature or with relatively great space velocity, or both, in order to limit the extent of conversion whereby the product consists largely of the polymers of isobutylene. Within the range of operating temperatures preferred in the present process (300° to 600° F.) isobutylene is more readily polymerized than normal butylene or propylene whereby selective polymerization may be effected by limiting the extent of conversion as described. Naturally more complete conversion may be effected by raising the temperature or reducing the space velocity, or both.

The moisture content of the reaction mixture apparently has no direct effect on the reaction. However, a saturated charge apparently has a slight beneficial effect in maintaining the original condition of the contact material. In any event, therefore, there is no necessity for complete drying of the charge to the process.

This application is a division of application Serial No. 321,521, filed February 29, 1940, by Edwin T. Layng and Louis C. Rubin which issued as Patent No. 2,310,161, on February 2, 1943, to Edwin T. Layng.

I claim:

1. The method of converting olefinic hydrocarbons to hydrocarbons of higher boiling points which comprises contacting said olefinic hydrocarbons at elevated temperature with a catalytic contact material comprising an intimate mixture of at least one metal pyrophosphate capable of reduction to a polymerization catalyst as the essential active ingredient of said contact material and a metal phosphate not capable of ready reduction to a polymerization catalyst.

2. The method of claim 1 wherein said metal pyrophosphate capable of reduction to a polymerization catalyst is selected from the group consisting of pyrophosphates of copper, mercury, zinc, magnesium, iron, aluminum and cobalt.

3. The method of claim 1 wherein said metal pyrophosphate capable of reduction to a polymerization catalyst is copper pyrophosphate.

4. The method of claim 1 wherein said metal pyrophosphate capable of reduction to a polymerization catalyst is mercury pyrophosphate.

5. The method of claim 1 wherein said metal pyrophosphate capable of reduction to a polymerization catalyst is cobalt pyrophosphate.

6. The method of claim 1 wherein said metal phosphate not capable of ready reduction to a polymerization catalyst is a calcium phosphate.

7. The method of converting olefinic hydrocarbons to hydrocarbons of higher boiling points which comprises contacting said olefinic hydrocarbons at elevated temperature with a catalytic contact material comprising a granular mass wherein each granule consists of a mixture of at least one metal pyrophosphate capable of reduction to a polymerization catalyst as the essential active ingredient of said contact material and a metal phosphate not capable of reduction to a polymerization catalyst.

8. Catalytic contact material for promoting the polymerization of olefinic hydrocarbons comprising a mixture of at least one metal pyrophosphate capable of reduction to a polymerization catalyst as the essential active ingredient of said contact material and a metal phosphate not capable of ready reduction to a polymerization catalyst.

9. Catalytic contact material for promoting the polymerization of olefinic hydrocarbons comprising a plurality of granules each consisting of an intimate mixture of at least one metal pyrophosphate capable of reduction to a polymerization catalyst as the essential active ingredient of said contact material and a metal phosphate not capable of ready reduction to a polymerization catalyst.

10. Catalytic contact material for promoting the polymerization of olefinic hydrocarbons comprising an intimate mixture of copper pyrophosphate as the essential active ingredient of said contact material and a metal pyrophosphate not capable of ready reduction to a polymerization catalyst.

11. Catalytic contact material for promoting the polymerization of olefinic hydrocarbons comprising an intimate mixture of at least one metal pyrophosphate capable of reduction to a polymerization catalyst as the essential active ingredient of said contact material and a calcium phosphate.

12. Catalytic contact material for promoting the conversion of olefinic hydrocarbons consisting of an intimate mixture of copper pyrophosphate as the essential active ingredient of said contact material and a calcium phosphate.

LOUIS C. RUBIN.